Patented Dec. 12, 1939

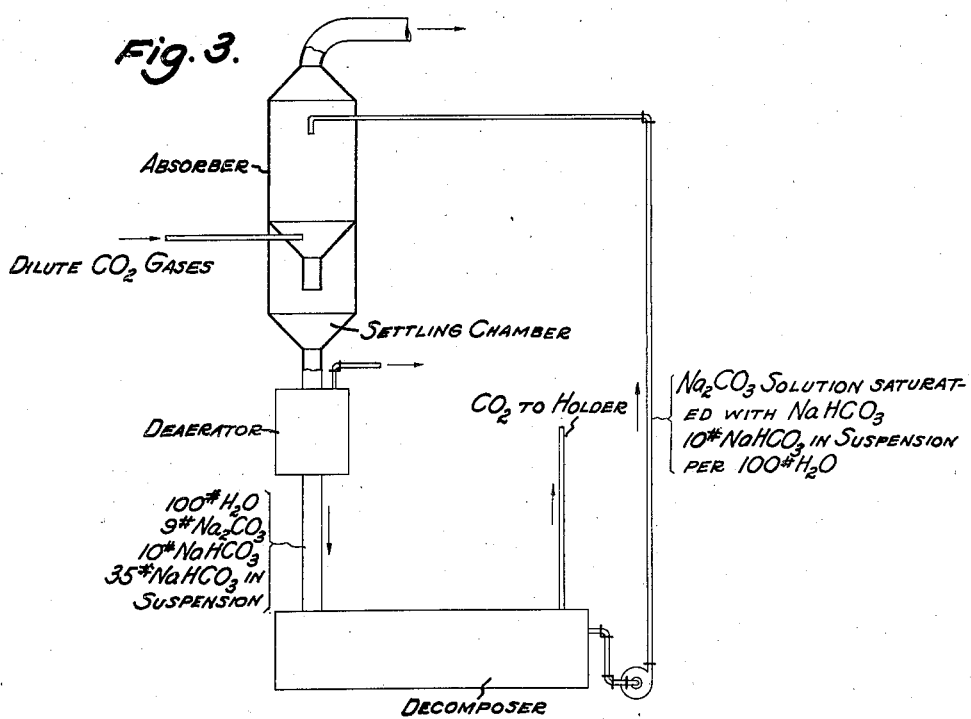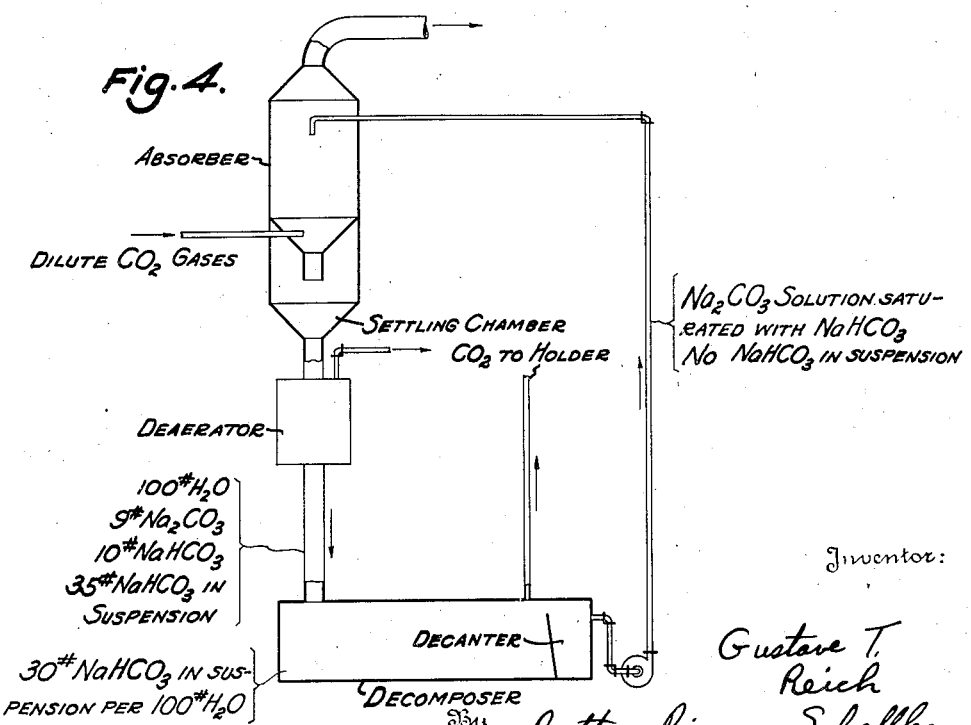

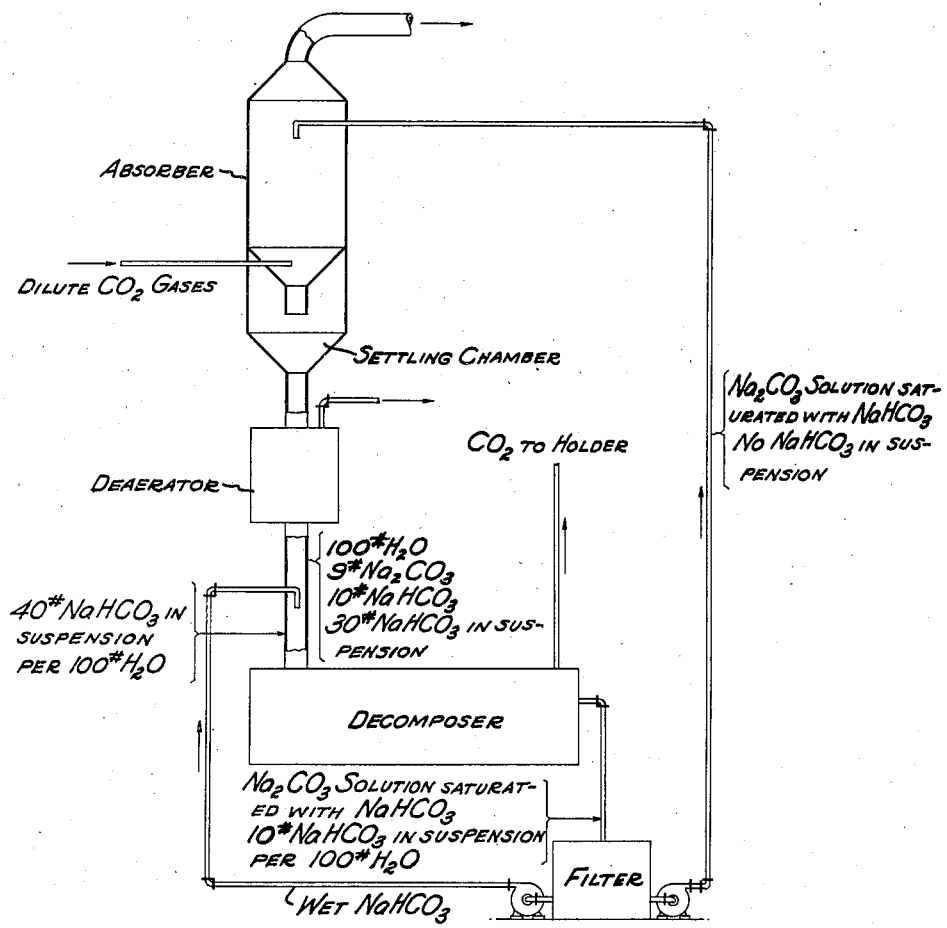

2,183,324

UNITED STATES PATENT OFFICE 2,183,324

RECOVERY OF CARBON DIOXIDE

Gustave T. Reich, Philadelphia, Pa.

Application February 16, 1938, Serial No. 190,859

12 Claims. (Cl. 23—150)

This invention relates to the recovery of carbon dioxide and is particularly an improved method of recovering carbon dioxide from gases containing this substance by absorbing the carbon dioxide in alkali carbonate solutions and decomposing the alkali bicarbonate thus formed by heat.

A principal object of the invention is the provision of a method whereby the recovery of carbon dioxide may be effected more efficiently, with lower heat expenditure and smaller space requirements than heretofore.

It has been found that the amount of heat required to decompose alkali bicarbonates in solid form is much less than that required to decompose these substances in solution. Furthermore since the rate of decomposition is much greater in the solid form, and the bulk is much smaller, the size of the apparatus required for a given production of carbon dioxide is very greatly reduced.

However, the handling of solid alkali bicarbonates is mechanically difficult and expensive in labor requirements and is to be avoided as far as possible. I have found that all the advantages of decomposing solid alkali bicarbonate, together with the mechanical advantages of handling fluid materials may be accomplished by handling and decomposing the solid alkali bicarbonate in suspension in a saturated solution of alkali bicarbonate. The solutions being handled will, of course, contain greater or less amounts of alkali carbonate in solution depending on the stage of the process, the alkali carbonate content being relatively low at the end of the absorption operation, and relatively high at the end of the decomposing operation.

The invention will be more particularly described with reference to the accompanying drawings in which:

Figs. 3, 4 and 5 are diagrammatic flow sheets of methods of operation embodying the principles of the invention.

Figure 1:
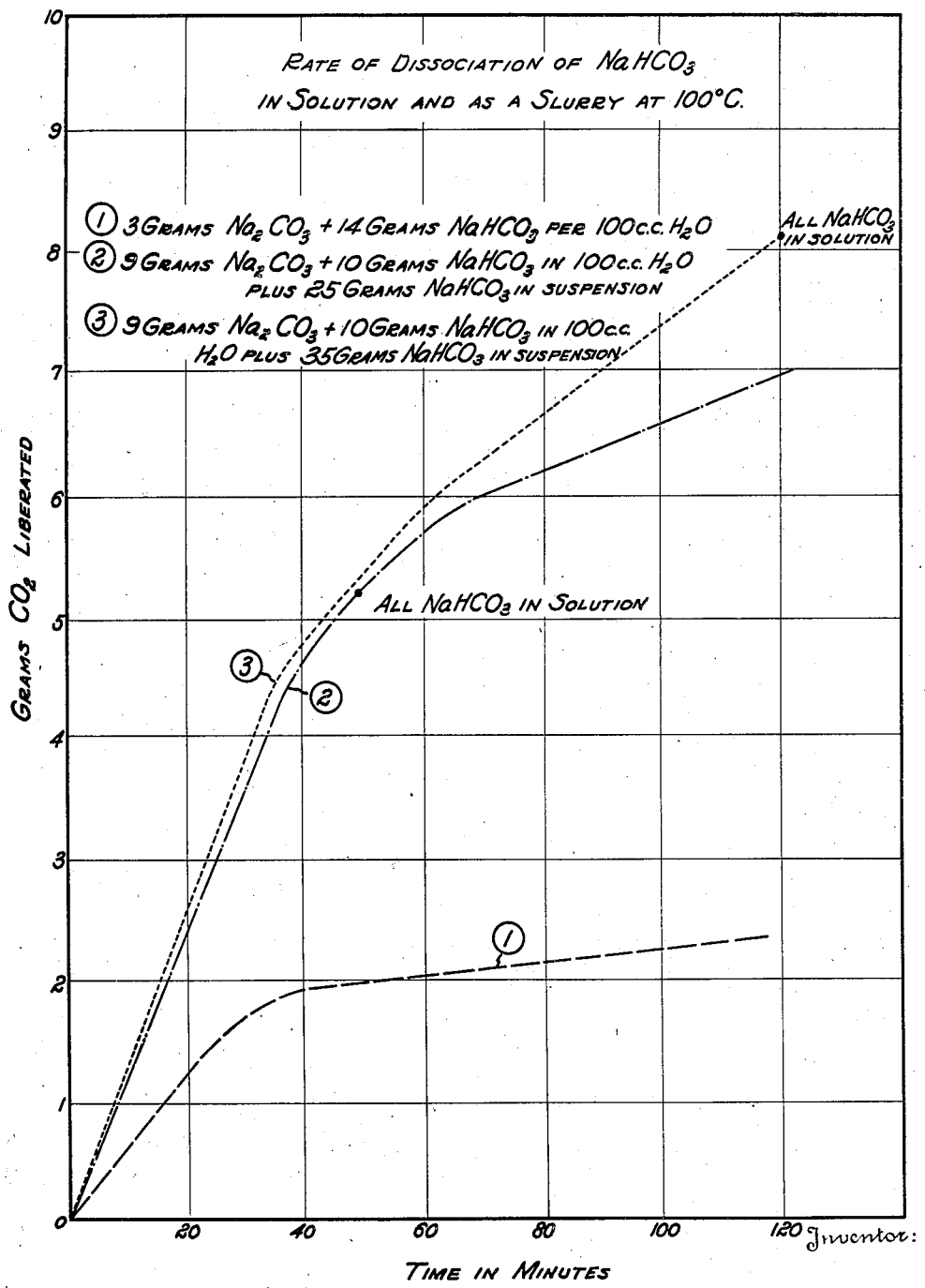
Fig. 1 is a graph showing the comparative rates of dissociation of sodium bicarbonate in solution and in suspension.

From the graph of Fig. 1 it will be seen that the rate of liberation of carbon dioxide from a suspension in saturated solution of sodium bicarbonate is more than twice that from a saturated solution containing no sodium bicarbonate in suspension, and that, whereas the rate of liberation from the saturated solution quickly falls off to a very low amount, the rate of liberation from the suspension is maintained substantially constant as long as any solid sodium bicarbonate is present.

Figure 2:
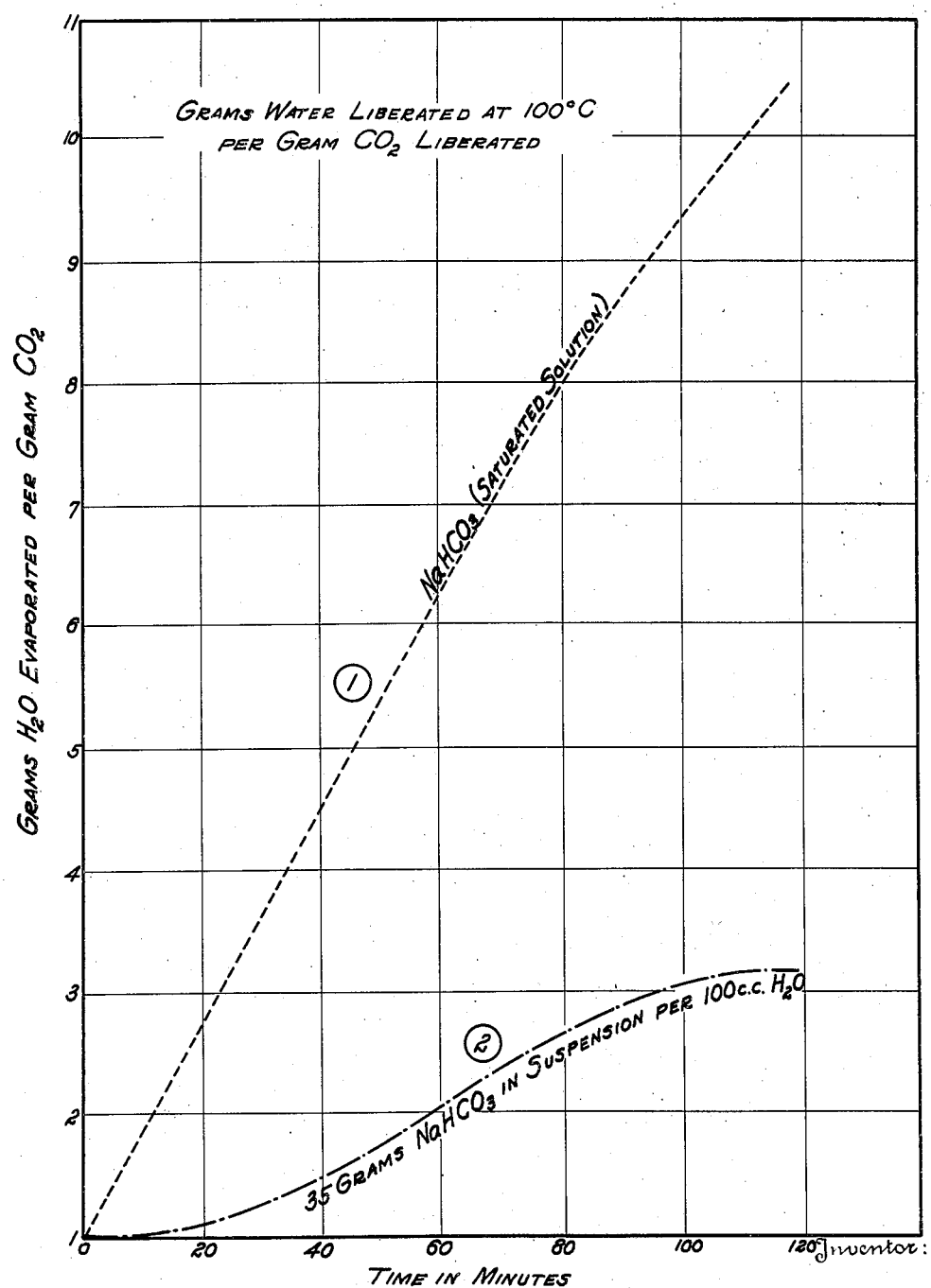
Fig. 2 is a graph showing the relative amounts of water evaporated per unit of carbon dioxide formed on heat sodium bicarbonate in solution and in suspension.

The graph of Fig. 2 shows that over three times as much water is evaporated per unit of carbon dioxide liberated from a saturated solution of sodium bicarbonate as from a suspension of solid sodium bicarbonate. Since the heat of evaporation of water is much greater than the heat of dissociation of alkali bicarbonate, it will be seen that the great reduction in the amount of water evaporated in the process of the invention represents a very large reduction in the steam requirements of the decomposition operation, which in the past have been the most costly element of the carbon dioxide recovery processes.

In order to maintain the process at the highest efficiency, it is preferred to maintain a substantial amount of solid alkali bicarbonate throughout the decomposition operation and the flow sheets of Figs. 3, 4 and 5 show different ways in which this may be accomplished.

In the method of Fig. 3, a suspension of sodium bicarbonate formed in the absorber is drawn off containing, for example, about 9 pounds of sodium carbonate and 10 pounds of sodium bicarbonate in solution and 35 pounds of sodium bicarbonate in suspension to each 100 pounds of water. This suspension is fed into the decomposer, preferably after passing it through a deaerator, where air bubbles are removed.

In the decomposer the suspension is heated, for example, to a temperature from about 85° C. to about 125° C., so that the suspended bicarbonate is dissociated into carbon dioxide, which is drawn off into a holder, and sodium carbonate, which goes into solution. The decomposition is continued until only about 10 pounds of solid bicarbonate in suspension remain to each one hundred pounds of water. This "weak slurry" is removed from the decomposer and returned to the absorber where the carbonate in solution is again converted into solid bicarbonate.

The contents of the absorber are maintained at a temperature suitable for the absorption operation, which is substantially below the temperature of dissociation, for example, at 30–55° C. The desired temperature is maintained by cooling the contents of the absorber to the extent necessary, either by cooling the absorber directly or by cooling the "weak slurry" returned to the absorber from the decomposer. In either case, since the weak slurry is saturated with bicarbonate at the temperature of dissociation, a further precipitation of bicarbonate will be effected during this cooling operation either before or after the weak slurry is returned to the absorber.

In the method of Fig. 4 instead of withdrawing a weak slurry from the decomposer, a clear solution of sodium carbonate saturated with sodium bicarbonate is decanted or otherwise withdrawn from the decomposer and returned to the absorber. The withdrawal is adjusted at such a rate as to maintain a predetermined average composition of slurry in the decomposer of, for example, 30 pounds of solid bicarbonate per 100 pounds of water. In carrying out this embodiment of the invention, it is advantageous to divide the decomposer into a plurality of chambers, through which the "strong slurry" from the absorber passes in series at successively lower contents of solid bicarbonate.

In the embodiment of the invention illustrated in Fig. 5, the "weak slurry" drawn off from the decomposer and containing, for example, 10 pounds of sodium bicarbonate per 100 pounds of water is separated by means of a filter or other separating device into a clear saturated solution of sodium bicarbonate strong in sodium carbonate which is returned to the absorber, and a very strong slurry which is mixed with the slurry coming from the absorber to form a "fortified slurry" containing, for example, 40 pounds of sodium bicarbonate in suspension per 100 pounds of water. In this embodiment of the invention, it may also be advantageous to divide the decomposer into a plurality of chambers and to add the very strong slurry from the filter to only the intermediate chamber or chambers.

It is, of course, not necessary that the slurry separated in the filter be stronger than the slurry coming from the absorber as it may be weaker or of the same concentration of suspended bicarbonate.

The proportion of solid bicarbonate separated from the "weak slurry" leaving the decomposer may be substantially increased by cooling the slurry, for example, to approximately the temperature of the absorber operation. In this way, the "load" of bicarbonate in the return cycle may be substantially decreased while maintaining the saturation of the liquid with respect to bicarbonate.

It will be seen that the invention is subject to a large number of variations without departing from the characteristic principle that the dissociation of alkali bicarbonate is entirely effected by heating solid alkali bicarbonate in suspension in a saturated solution of alkali bicarbonate, and that a saturated solution of alkali bicarbonate containing varying amounts of alkali carbonate is circulated preferably continuously and at a uniform rate between the absorber and the decomposer and serving as a carrier medium for the solid bicarbonate from the absorber to the decomposer and in the decomposer. The process can, of course, be operated with potassium carbonate and bicarbonate, or with mixtures of sodium and potassium carbonates and bicarbonates.

I claim:

1. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate not more than the alkali bicarbonate in suspension to alkali carbonate and carbon dioxide while maintaining the alkali carbonate in solution, and returning the solution of alkali carbonate saturated with alkali bicarbonate to contact with gases containing carbon dioxide.

2. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate only a portion of the alkali bicarbonate in suspension to alkali carbonate and carbon dioxide while maintaining the alkali carbonate in solution, and returning the solution of alkali carbonate saturated with alkali bicarbonate to contact with gases containing carbon dioxide.

3. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate only a portion of the alkali bicarbonate in suspension to alkali carbonate and carbon dioxide while maintaining the alkali carbonate in solution, separating the solution of alkali carbonate saturated with alkali bicarbonate thereby produced from undissociated solid bicarbonate, and returning the solution to contact with gases containing carbon dioxide.

4. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate only a portion of the alkali bicarbonate in suspension to alkali carbonate and carbon dioxide while maintaining the alkali carbonate in solution, separating the solution of alkali carbonate saturated with alkali bicarbonate thereby produced from undissociated solid bicarbonate at such a rate as to maintain a predetermined concentration of solid alkali bicarbonate in the dissociation zone, and returning the solution to contact with gases containing carbon dioxide.

5. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate only a portion of the alkali bicarbonate in suspension to alkali carbonate and carbon dioxide while maintaining the alkali carbonate in solution, separating the residual suspension into a solution of alkali carbonate saturated with alkali bicarbonate and a portion enriched in solid alkali bicarbonate, returning the solution to contact with gases containing carbon dioxide, and returning the portion enriched with solid alkali bicarbonate to the dissociation zone.

6. A method as defined in claim 1 wherein the suspension of alkali bicarbonate is freed of gases suspended therein before it is dissociated.

7. A method as defined in claim 1 wherein the suspension of alkali bicarbonate is thickened before it is dissociated.

8. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate not more than the alkali bicarbonate in suspension to alkali carbonate and carbon dioxide while maintaining the alkali carbonate in solution, cooling the resulting solution of alkali carbonate saturated with alkali bicarbonate, and contacting the cooled solution with gases containing carbon dioxide.

9. A method of recovering carbon dioxide which comprises contacting gases containing carbon dioxide with a solution of alkali carbonate saturated with alkali bicarbonate, whereby a suspension of alkali bicarbonate is formed, heating said suspension to dissociate not more than the alkali bicarbonate in suspension to alkali carbonate and carbon dioxide while maintaining the alkali carbonate in solution, cooling the resulting solution of alkali carbonate saturated with alkali bicarbonate, separating solid bicarbonate therefrom, returning the separated bicarbonate to the dissociation zone, and contacting the liquor with gases containing carbon dioxide.

10. A method of recovering carbon dioxide which comprises contacting gases containing carbon dioxide with a solution of alkali carbonate saturated with alkali bicarbonate at a temperature substantially below 85° C., whereby a suspension of alkali bicarbonate is formed, heating said suspension to at least 85° C., to dissociate not more than the alkali bicarbonate in suspension to alkali carbonate and carbon dioxide while maintaining the alkali carbonate in solution, and mixing the resulting solution with the solution being contacted with gases containing carbon dioxide.

11. A method of recovering carbon dioxide which comprises contacting gases containing carbon dioxide with a solution of alkali carbonate saturated with alkali bicarbonate at a temperature substantially below 85° C., whereby a suspension of alkali bicarbonate is formed, heating said suspension to at least 85° C., to dissociate not more than the alkali bicarbonate in suspension to alkali carbonate and carbon dioxide while maintaining the alkali carbonate in solution, cooling the resulting solution substantially below 85° C., and mixing it with the solution being contacted with gases containing carbon dioxide.

12. A method of recovering carbon dioxide which comprises contacting gases containing carbon dioxide with a solution of alkali carbonate saturated with alkali bicarbonate at a temperature substantially below 85° C., whereby a suspension of alkali bicarbonate is formed, heating said suspension to at least 85° C., to dissociate not more than the alkali bicarbonate in suspension to alkali carbonate and carbon dioxide while maintaining the alkali carbonate in solution, cooling the resulting solution substantially below 85° C., separating solid alkali bicarbonate therefrom, returning the separated bicarbonate to the dissociation zone, and mixing the separated liquid with the solution being contacted with gases containing carbon dioxide.

GUSTAVE T. REICH.